(12) United States Patent
Gräf et al.

(10) Patent No.: US 6,368,725 B1
(45) Date of Patent: Apr. 9, 2002

(54) METHOD FOR PRODUCING A COATING POWDER COMPOSITION

(75) Inventors: Knut Gräf, Hattingen; Hans-Ulrich Simmrock, Düsseldorf; Alexandra Jacobs, Niedernhausen; Volker Mörs, Frankfurt am Main; Bennett Ward, Königstein, all of (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/582,480
(22) PCT Filed: Dec. 22, 1998
(86) PCT No.: PCT/EP98/08460
§ 371 Date: Oct. 13, 2000
§ 102(e) Date: Oct. 13, 2000
(87) PCT Pub. No.: WO99/33926
PCT Pub. Date: Jul. 8, 1999

(30) Foreign Application Priority Data

Dec. 23, 1997 (DE) .......................... 197 57 544

(51) Int. Cl.⁷ .................. B32B 27/06; B32B 15/02; C08J 5/00
(52) U.S. Cl. .................. 428/482; 528/272; 528/491; 528/503; 524/81; 524/700; 524/783; 524/801; 524/847; 525/437; 427/207.1; 427/212; 427/340; 427/384; 428/304.4; 428/402
(58) Field of Search .................. 528/272, 491, 528/503; 524/81, 700, 783, 801, 847; 525/437; 427/207.1, 212, 340, 384; 428/304.4, 402, 482

(56) References Cited

U.S. PATENT DOCUMENTS 3,985,700 A * 10/1976 Nicks et al.
5,736,621 A * 4/1998 Simon et al. ................ 528/271

* cited by examiner

Primary Examiner—Samuel A. Acquah
(74) Attorney, Agent, or Firm—Sudhir G. Deshmukh

(57) ABSTRACT

Process for the preparation of a powder lacquer composition based on polyester by
  a) common or separate heating to a temperature of 120–200° C. of A) 99–40 wt. % polyester precondensates, and/or of monomers usable for the preparation thereof, B) 1–60 wt. % pigments and C) 0–10 wt. % wetting additives and/or further additives which are conventionally used for lacquers, wherein the percentages by weight total 100%,
  b) homogeneous mixing of the components A), B) and C) with the application of shear forces and with the heating temperature maintained,
  c) dispersion of the mixture obtained in a dispersing medium at a temperature equal to or above the melting temperature of the starting components A), B) and C) with further polycondensation of the polyester precondensate A), and/or of the monomers,
  d) cooling of the dispersion and addition of a conventional cross-linking agent for the polyester and optionally of conventional additives, within the temperature range 60 to 140° C.

10 Claims, 1 Drawing Sheet

METHOD FOR PRODUCING A COATING POWDER COMPOSITION

Figure 1:
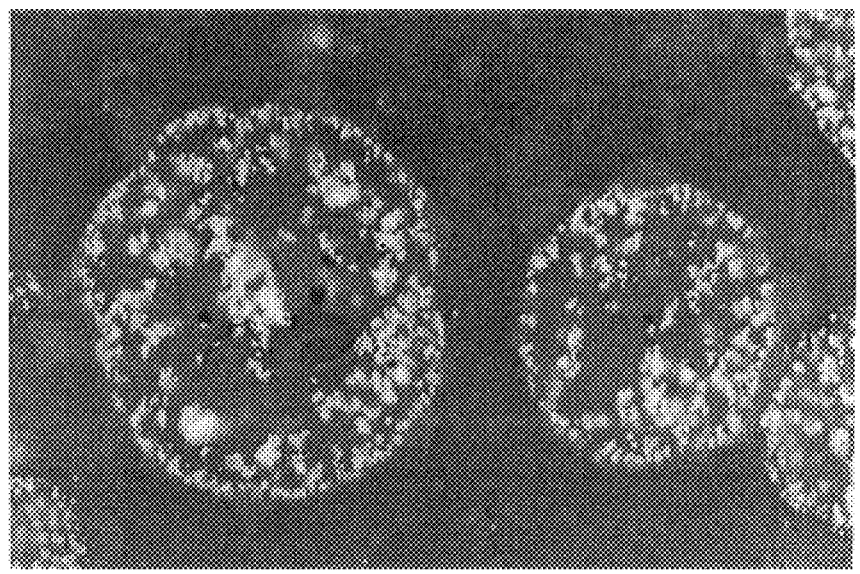

The invention relates to the preparation of coloured powder lacquers in particular for use in powder coating compositions. The invention also relates to the use of the powder lacquers obtained for the coating of substrates, as well as to the coated substrates thus obtained.

Powder lacquers are generally prepared by conventional extruder technology. For this, the constituents of the powder lacquer, that is to say the binders, curing agents and optionally pigments and further additives, as solids, are pre-mixed intensively in the dry state in the requisite quantitative ratios, and are then melted at the lowest possible temperature in an extruder and intermixed intensively. The binders and curing agents are thereby plasticised, and the optionally contained pigments and extenders wetted. The optionally coloured extrudate which is obtained is then rolled out to a thin layer, cooled and crushed into coarse granules which are ground to the finished powder lacquer in a mill.

Difficulties can arise in this process, in particular with regard to the extrusion and grinding processes. The extrusion process may proceed too slowly for highly reactive binder mixtures, such that partial gelation occurs during which a reduced residence time in the extruder negatively influences pigment dispersion in the binder. Furthermore, only binders within a certain viscosity range can be processed by extruder. The broad particle size spectrum within the range 0.1 to 500 micrometers, for example, which forms during grinding necessitates additional sieving and milling processes for specific applications. Furthermore, the fines which arise are disadvantageous in terms of health and processing technology.

It is furthermore known to utilise as an auxiliary agent for the preparation of powder lacquers low molecular weight inert compounds in the form of compressible fluids. Here, the solution or suspension formed by the compressible fluid and the components of the powder lacquer composition is sprayed under expansion, such that the cooling brought about by the process of expansion causes the powder lacquer particles to form. Particle sizes of from 5 to 150 micrometers, but also very fine particles within the range 1 to 5 micrometers, can be obtained by utilising corresponding nozzles.

High pressures and large quantities of gas are generally necessary in such processes in order to dissolve the relevant solids in the supercritical fluid.

Further methods for preparing powders are based on the so-called "non-aqueous dispersion (NAD) processes". Here, a polymer or polymer precursor, for example a polyester, is incorporated in a dispersing medium at a temperature below 200° C., for example. In order to prepare coloured powders pigments are added to the dispersion, preferably after cooling of the dispersion. The corresponding powder particles are obtained by further cooling, separation and drying of the resulting particles.

The addition of the pigments at a reduced temperature, for example room temperature or slightly higher, gives rise to problems with regard to cohesion between the polymer particles and the pigment particles, in that separation occurs between the particles. If, on the other hand, the pigments are added to the dispersion at a relatively high temperature, particle sizes are altered. It is in general difficult with such processes to obtain a narrow particle size distribution as well as homogeneously organised particles. Coatings with powder lacquer compositions based on such NAD lacquer powders are unsatisfactory owing to lacquer film defects, for example cratering.

The object of the present invention is therefore to develop a process based on an NAD process for pigmented lacquer powders, by which powder particles having a narrow grain size range and homogeneous particle organisation result, and powder coatings with powder lacquer compositions based on pigmented lacquer powders prepared in this manner are obtained, which have the desired good lacquer characteristics.

The object is achieved by a process provided by the invention for the preparation of a powder lacquer composition based on polyester by a) common or separate heating to a temperature of 120–200° C. of
   A) 99–40 wt. % of one or more polyester precondensates, and/or of monomers usable for the preparation thereof,
   B) 1–60 wt. % of one or more pigments and
   C) 0–10 wt. % of one or more wetting additives and/or further additives which are conventionally used for lacquers, wherein the percentages by weight total 100%, b) homogeneous mixing of the components A), B) and C) with the application of shear forces and with the heating temperature maintained, c) dispersion in a dispersing medium of the mixture obtained, at a temperature equal to or above the melting temperature of the starting components A), B) and C) with further polycondensation of the polyester precondensate A), and/or of the monomers thereof until a polyester of a desired molecular weight is obtained, d) cooling of the dispersion and addition of a conventional cross-linking agent for the polyester and optionally of conventional additives, within the temperature range 60 to 140° C.

The homogeneous mixing of the components with the application of shear forces may take place, for example, within a period of from 10 to 100 minutes, depending on the type of starting components, in particular depending on the type and quantity of pigments utilised.

In order to achieve the desired molecular weight of the polyester up to a region of, for example, 50 000 g/mol, the temperature in the dispersing medium may be within the range 120 to 280° C. after the addition of the composition. After the desired molecular weight has been achieved the reaction may be terminated by lowering the temperature. The reaction may be terminated at any time by corresponding cooling.

In order to prepare powder lacquer compositions the process may be carried on in continuous manner to the desired final molecular weight before the addition of the cross-linking agent(s).

The process may be interrupted after the composition to be used according to the invention has been heated and mixed homogeneously with the application of shear forces, that is after a coloured polyester precondensate mixed homogeneously after the addition of pigments and optionally wetting additives has been obtained, and the coloured polyester precondensate may undergo interim storage until it is reacted further.

The process is preferably carried on in continuous manner until a polyester of the desired final molecular weight is obtained. This is achieved by maintaining the temperature within a range, for example between 120 and 280° C., in the dispersing medium and distilling off the condensation products such as, for example, water, methanol. In order to prepare powder lacquer compositions the dispersion is then cooled with the composition to be used according to the invention to temperatures of between 60 and 140° C., and the cross-linking agent(s) as well as optionally further additives is/are added to the dispersion bath under these conditions. The finished coloured powder lacquer results after cooling of the dispersion, separation and drying by conventional processes.

In order to process further the coloured polyester precondensate which has optionally undergone interim storage it may, after being heated to a temperature of from 120 to 200° C., be dispersed in a dispersing medium at a temperature equal to or above the melting temperature of the starting components, for example from 180 to 280° C., optionally with dispersion stabilisers, until the final molecular weight is achieved. After cooling of the dispersion to a temperature of from 60 to 140° C., the cross-linking agent and optionally the additives may be added to the dispersing medium and the finished coloured powder lacquer can result after cooling, separation and drying.

After cooling to, for example, room temperature or below 60° C., separation and drying of the particles there results in accordance with the process according to the invention a coloured powder lacquer the particle structure of which is organised homogeneously and the grain size distribution of which is within a narrow range of from 10 to 50 micrometers.

Aliphatic oils, for example, having a boiling point of from 150 to 300° C. can serve as the dispersion base. The oils are generally free of aromatics. Aromatics may optionally also be contained, preferably in a quantity of less than 2 wt. %.

The dispersion bath may optionally contain one or more dispersion stabilisers, for example in a quantity of up to 5 wt. %, in relation to the polyester component. These may be conventional wetting additives which are incorporated in the bath by stirring.

The polyester precondensate of the component A), which is to be used according to the invention may be prepared in conventional manner by reacting polycarboxylic acids, anhydrides thereof and/or esters thereof with polyalcohols. Esterification may proceed in conventional manner, for example in a nitrogen atmosphere at elevated temperature, for example between 120 and 200° C. to the desired viscosity, for example less than 1000 mPa·s, in particular less than 500 mPa·s.

Dicarboxylic acid components are preferably utilised as the polycarboxylic acid component. The dicarboxylic acid components may be aliphatic, cycloaliphatic and/or aromatic dicarboxylic acids and/or anhydrides thereof. These are, for example, adipic acid, sebacic acid, dodecanoic acid, 1,4-cyclohexanedicarboxylic acid, dimer fatty acid, phthalic acid, isophthalic acid, terephthalic acid. The acids may be used singly or as a mixture. The carboxylic acids may also contain further fictional groups, for example sulfonic acid groups.

Diols or diols mixed with polyols are preferably usable as the polyol components.

Examples of diols are aliphatic and/or cycloaliphatic diols such as, for example, ethylene glycol, diethylene glycol, propanediol, hexanediol, propylene glycol, cyclohexanedimethanol, neopentyl glycol, hydroxypivalic acid, neopentyl glycol ester. Triols, for example trimethylol propane, are, for example, usable as polyols mixed with diols.

In order to raise the functionality of the polyester, for example by the introduction of carbonyl and/or hydroxyl groups, higher-functional polycarboxylic acids and/or polyols may also be utilised.

The polyester precondensate may be hydroxy-functional and/or carboxy-functional. The hydroxy and/or carboxy functions may be introduced by suitable selection of the starting materials and/or the constituent amounts thereof. The molar ratio of diol or of diol and/or polyol to dicarboxylic acid or dicarboxylic acid anhydride may be from 1.2:1 to 0.8:1, for example.

In preparing the precondensate the procedure is preferably such that the dicarboxylic acid component such as, for example, terephthalic acid, isophthalic acid, adipic acid or fumaric acid is reacted together with the diol component and/or the polyol component at elevated temperature, for example 120 to 200° C., it being possible to work in the presence of conventional esterification catalysts. Esterification catalysts are, for example, dibutyltin dilaurate, zinc acetate, tin chloride or tetrabutoxytitanate.

In place of the precondensate which is usable according to the invention, or optionally together with the latter, the monomers to be used for the preparation thereof, that is to say polycarboxylic acids or anhydrides thereof and polyalcohols, such as have been named hereinabove, and in the quantitative ratio indicated, may also be utilised as the component A.

Pigments are used as the component B) which is to be used according to the invention. Any organic or inorganic pigments or colorants which are temperature-stable at temperatures of at least 200° C. are usable as pigments. Mixtures of different pigments or colorants may also be used. Examples of inorganic pigments are titanium dioxide, red iron oxide, brown iron oxide, black iron oxide, carbon black, chromium titanium yellow, cobalt/aluminium oxide, and examples of organic pigments are compounds from the class comprising phthalocyanines, quinacridones, azo pigments, vat colorants. Special-effect pigments, for example pearlescent pigments of the Iriodin type, are also usable.

The pigments may also contain extenders such as, for example, barium sulfate, calcium carbonate, kaolin, which are well-known to those skilled in the art.

Pigment preparations may moreover be used in which, for example, the pigments are already pre-dispersed in diols and/or polyols, with the possibility of the diols and/or polyols themselves being components of the polyesters prepared according to the invention.

Wetting additives or dispersion stabilisers optionally used as the component C) may be those which are well-known to those skilled in the art, for example nonionic and/or ionic wetting agents. So-called ampholytic copolymers are, for example, also usable as wetting additives. They may be monomeric, oligomeric and/or polymeric. Further additives which are conventionally used for lacquers may optionally be added, for example, levelling agents, antifoams as well as catalysts, flatting agents (for example Kittel, Lehrbuch der Lacke und Beschichtungen [Manual of Lacquers and Coatings], Vol. 3, Colomb-Verlag, 1976).

The resulting polyesters may exhibit thermoplastic behaviour, and they may contain functional groups by way of which cross-linking is possible.

The compounds known to those skilled in the art are usable as cross-linking agents. These are, for example, epoxides, for example based on diglycidyl-bisphenol A as well as triglycidyl isocyanurate. Further cross-linking agents are those based on amino resins such as, for example, melamine resins, urea resins, dicyanodiamide resins. Isocyanate cross-linking agents may furthermore be utilised. These are the aliphatic, cycloaliphatic or aromatic diisocyanates or polyisocyanates known as lacquer polyisocyanates. The reactive isocyanate groups may be blocked in known manner with known blocking agents such as low molecular weight alcohols, amino alcohols, oximes, lactams or acetoacetic derivatives.

The cross-linking agent content is normally from 2 to 50 wt. %, for example from 2 to 20 wt. %, preferably from 5 to 10 wt. %, in relation to the polyester component. The epoxy/polyester hybrid systems which are well-known to those skilled in the art may have a cross-linking agent content of up to 50 wt. %.

Consequently, for example, the binder/curing agent systems based on polyesters, which are known in the powder lacquer sector, for example functional polyester/triglycidyl isocyanurate (TGIC) curing agents, acid polyester/epoxy curing agents, polyester acrylate powders, may be used.

The resulting powder lacquers achieve cross-linking temperature and gelation time values to equal to those of powder lacquers prepared by conventional methods, for example by way of extrusion.

The resulting particles of predominantly spherical powder form are homogeneously organised particles having a narrow grain size range and are pigmented homogeneously. They may be prepared, for example, having a number average molecular weight (Mn) of the binder constituent of up to 50 000 g/mol. The particle size of the majority of the particles is less than 50 micrometers, preferably less than 40 micrometers and particularly preferably less than 30 micrometers.

The powders prepared according to the invention are utilised as coating agents for powder coatings. Substrates of metal or plastics material, for example, are suitable as substrates.

The powder lacquer composition may be applied to the surfaces requiring coating and stoved by methods which are conventional for powder lacquer, for example electrostatic application by corona discharge or tribocharging. It is possible to apply film thicknesses of, for example, from 15 to 200 micrometers, preferably from 20 to 75 micrometers. The powder lacquer systems are stoved under the conditions of temperature and time required in order to effect complete cross-linking, for example at temperatures of from 100 to 250° C. and times of from 5 to 30 minutes.

Powder coatings having very good surface characteristics can be obtained owing to the homogeneously organised particles and the homogeneous pigmentation of these particles. Comparison with the NAD processes known hitherto shows it to be surprising that such homogeneity and grain size distribution of the particles can be achieved by the procedure according to the invention, and these lead to uniform and homogeneous lacquer surfaces after application as powder lacquer.

The Examples which follow serve to explain the invention:

EXAMPLE 1
Preparation of a Polyester Precondensate Utilised According to the Invention 4090 g dimethyl terephthalate, 888.4 g dimethyl isophthalate, 2814 g neopentyl glycol and 1.5 g manganese acetate tetrahydrate as the catalyst are weighed together into a round-bottomed flask and heated to 150° C. under an inert gas atmosphere. The temperature is then increased to 225° C. over a period of 4 hours. 6181.1 g of a polyester precondensate are obtained after working-up.

EXAMPLE 2
Preparation of Pigment-containing Polyester Precondensates Utilised According to the Invention Polyester precondensate according, to Example 1 and pigment are weighed into an 8.5 cm diameter vessel, and the mixture is heated to 150° C. Wetting agents are then added. The quantities used are shown below, expressed as g:

|  | 2a | 2b | 2c | 2d | 2e |
|---|---|---|---|---|---|
| Precondensate | 320 | 313.2 | 378 | 378 | 378 |
| Titanium dioxide, type 2160 (Kronos) | 80 | 80 | — | — | — |
| Carbon black VW 200 (Degussa) | — | — | 20 | — | — |
| Phthalocyanine blue | — | — | — | 20 | — |
| Irgazin Red BO (Ciba) | — | — | — | — | 20 |
| Wetting agent Additol XL260 (Vianova) | — | 6.8 | 2 | — | 2 |
| Wetting agent Genapol T800 (Hoechst) | — | — | — | 2 | — |

The components are mixed homogeneously at 8000 rpm for 10 to 60 minutes in a Dispermat CV type high-speed mixer, with the aid of a 4 cm diameter toothed disk.

EXAMPLE 3
Preparation of a White Cross-linkable Powder Lacquer 287.4 g of the pigmented polyester precondensate of Example 2b, 1 180 g Isopar P and 45 g Isopar L as the dispersion oil and 88 mg antimony trioxide are weighed into a 1-litre reactor and heated. When all the components have melted, at a reaction temperature of 150° C., the temperature is raised, with vigorous stirring of the reactor contents, to the boiling temperature of the dispersion oil, 230° C. The reaction mixture is left for one hour at this temperature, with further stirring and with the condensation products being distilled off. After cooling of the dispersion to 100 to 120° C., 15.7 g triglycidyl isocyanurate (TGIC) are added to the mixture. After further cooling to room temperature, filtration of the powder, washing and drying, a powder having a narrow grain size range and a particle size of from 30 to 40 micrometers results. After electrostatic application and hardening at 180° C. for 20 minutes, a uniform and homogeneous lacquer surface is obtained.

Figure 2:
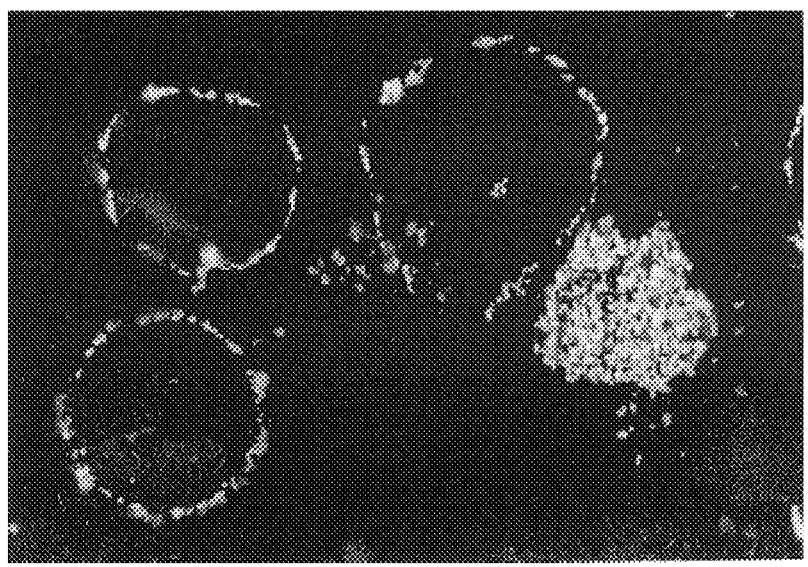

The FIGS. 1 and 2 attached are SEM (scanning electron microscopic) photographs of powder lacquers. FIG. 1 shows particles of a polyester powder lacquer pigmented with titanium dioxide and prepared in accordance with the prior art (NAD process). The titanium dioxide can be seen to have become located only at the periphery of the polyester powder lacquer particles. A large proportion of the pigments has moreover agglomerated in the dispersing medium (heat exchanger) and failed to disperse within the powder.

FIG. 2, on the other hand, shows polyester powder lacquer particles prepared according to the invention. The pigments can be seen to be distributed virtually homogeneously within the polyester particles, and no additional agglomerates are present in the dispersing medium.

What is claimed is:

1. Process for the preparation of a powder lacquer composition based on polyester by
   a) common or separate heating to a temperature of 120–200° C. of
      A) 99–40 wt. % of one or more polyester precondensates, and/or of monomers usable for the preparation thereof,
      B) 1–60 wt. % of one or more pigments and
      C) 0–10 wt. % of one or more wetting additives and/or further additives which are conventionally used for lacquers, wherein the percentages by weight total 100%,
   b) homogeneous mixing of the components A), B) and C) with the application of shear forces and with the heating temperature maintained, c) dispersion in a dispersing medium of the mixture obtained, at a temperature equal to or above the melting temperature of the starting components A), B) and C) with further polycondensation of the polyester precondensate A), and/or of the monomers thereof until a polyester is obtained, d) cooling of the dispersion and addition of a conventional cross-linking agent for the polyester and optionally of conventional additives, within the temperature range 60 to 140° C.

2. Process according to claim 1, characterised in that after the mixing step b) interim storage of the mixture which was obtained takes place.

3. Process according to claim 1, characterized in that the dispersing medium used in stage c) contains one or more conventional dispersion stabilizers.

4. Process according to claim 1, 2, or 3 characterized in that an inert liquid having a boiling point within the range of 150 to 300° C. is used as the dispersing medium.

5. Powder lacquer compositions, for use in coating substrate, produced according to claim 1, 2, 3 or 4.

6. Coated substrate obtained according to claim 5.

7. Process according to claim 2, characterized in that the dispersing medium used in stage c) contains one or more conventional dispersion stabilizers.

8. Powder lacquer compositions, for use in coating substrates, produced according to claim 4.

9. Coated substrate obtained according to claim 8.

10. Process according to claim 1 wherein a grain size distribution of said powder lacquer composition ranges from 10 to 50 micrometers.

* * * * *